US007721483B2

(12) United States Patent
Angell et al.

(10) Patent No.: US 7,721,483 B2
(45) Date of Patent: May 25, 2010

(54) DEVICE AND METHOD FOR CATCHING ZOOPLANKTON OR OTHER MICROORGANISMS

(75) Inventors: Snorre Angell, Sortland (NO); Håvard Røsvik, Trondheim (NO); Stig Jansson, Børsa (NO)

(73) Assignee: Sintef Fiskeri OG Havbruk AS, Trondheim (NO)

( * ) Notice: Subject to any disclaimer, the term of this patent is extended or adjusted under 35 U.S.C. 154(b) by 138 days.

(21) Appl. No.: 11/665,841

(22) PCT Filed: Oct. 28, 2005

(86) PCT No.: PCT/NO2005/000410

§ 371 (c)(1),
(2), (4) Date: Sep. 11, 2007

(87) PCT Pub. No.: WO2006/054900

PCT Pub. Date: May 26, 2006

(65) Prior Publication Data

US 2008/0141577 A1 Jun. 19, 2008

(30) Foreign Application Priority Data

Oct. 28, 2004 (NO) ................................ 20044657

(51) Int. Cl.
*A01K 73/02* (2006.01)
*A01K 79/00* (2006.01)

(52) U.S. Cl. ................................ 43/6.5; 43/9.1; 43/4.5

(58) Field of Classification Search .................... 43/6.5, 43/9.1, 4.5; *A01K 73/02, 79/00*
See application file for complete search history.

(56) References Cited

U.S. PATENT DOCUMENTS

| | | | | |
|---|---|---|---|---|
| 3,478,460 | A * | 11/1969 | Kimble et al. | 43/4.5 |
| 3,488,876 | A * | 1/1970 | Lowrance | 43/4 |
| 3,987,572 | A * | 10/1976 | Bieser et al. | 43/4.5 |
| 4,702,676 | A * | 10/1987 | Westfall et al. | 417/87 |
| 5,347,798 | A * | 9/1994 | Quin | 56/8 |
| 6,328,165 | B1 * | 12/2001 | Baker et al. | 209/235 |

FOREIGN PATENT DOCUMENTS

| | | |
|---|---|---|
| DE | 29917425 U1 | 10/1999 |
| DE | 10028313 C1 | 10/2001 |
| NO | 27776 | 3/1917 |
| NO | 54817 | 6/1935 |
| WO | WO-92-19100 A1 | 11/1992 |
| WO | WO-95-22893 A2 | 8/1995 |

* cited by examiner

*Primary Examiner*—Son T Nguyen
*Assistant Examiner*—Marisa Conlon
(74) *Attorney, Agent, or Firm*—Birch, Stewart, Kolasch & Birch, LLP

(57) ABSTRACT

A harvesting device for zooplankton (1) or other micro organisms in a body of water (2). The new and inventive in the harvesting method is amongst others a bubble diffuser (3) arranged for being submerged in the body of water (2) and arranged for releasing gas bubbles (4) preferably air, in the body of water so as for said bubbles (4) may attach to zooplankton (1) and bring them closer to the surface (21) of said body of water (2) for collection by means of a skimmer or trawl (5). Said trawl is further arranged as a skimmer with a transportation tube from the aft of said skimmer to a vessel which both tows the trawl and processes the harvested zooplankton at the same time.

14 Claims, 6 Drawing Sheets

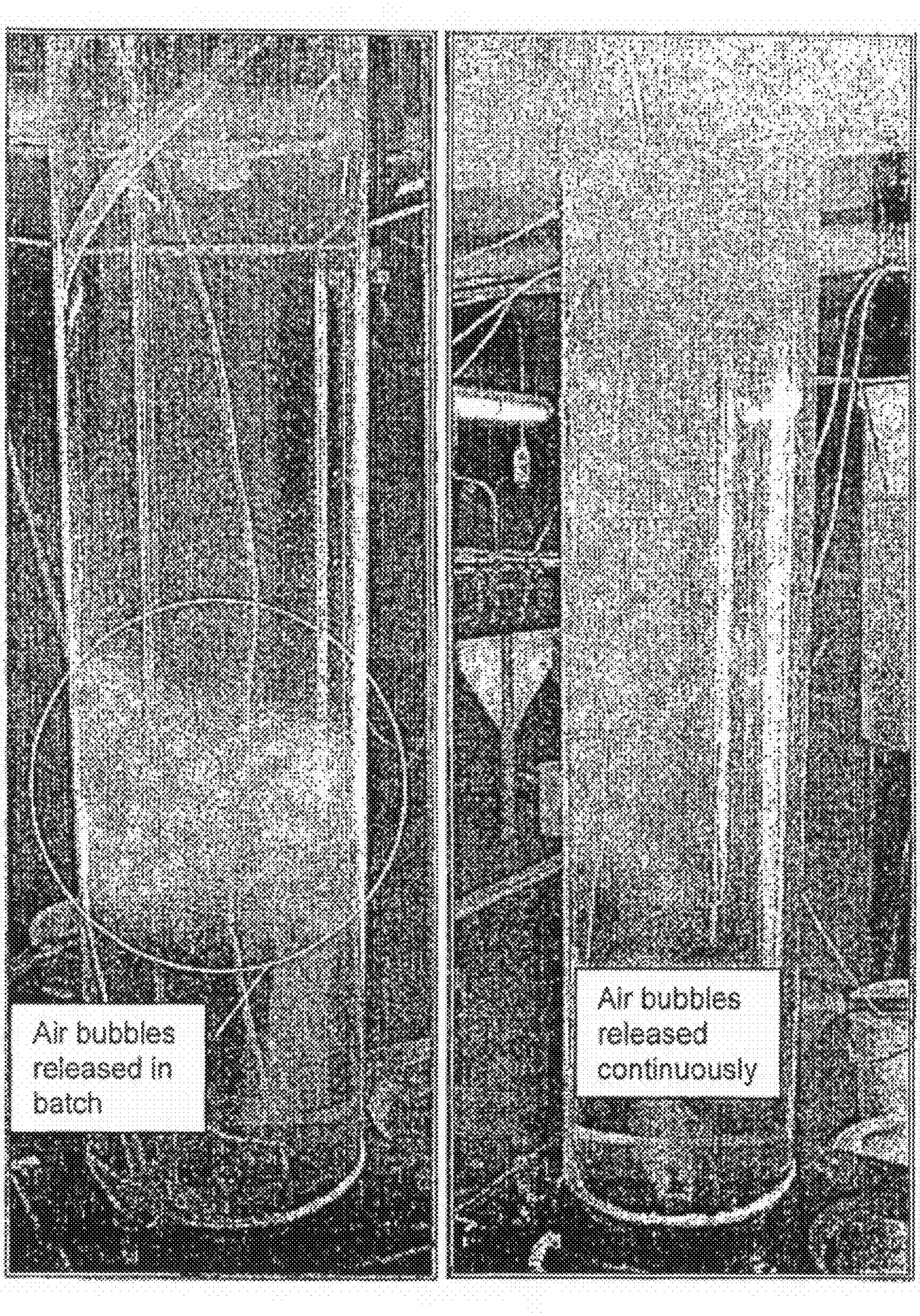
Fig. 4 : cylinder with released bubbles in water

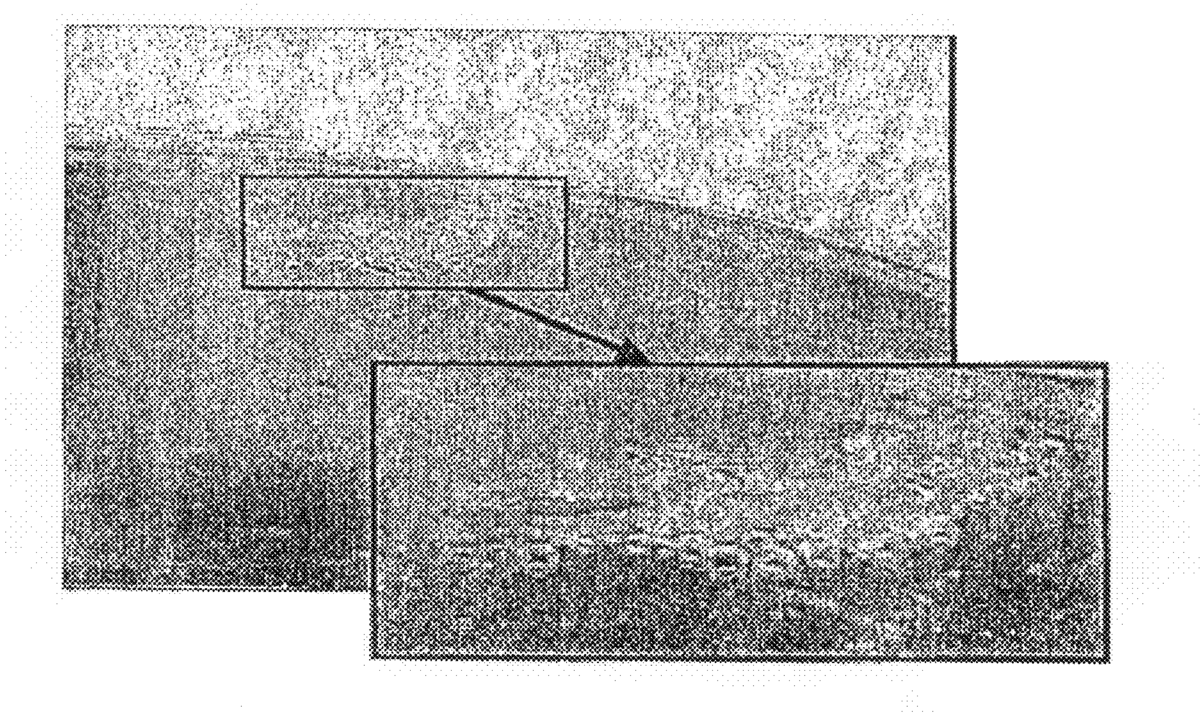
Fig. 5 : Krill in the surface, with air bubbles attached to the body

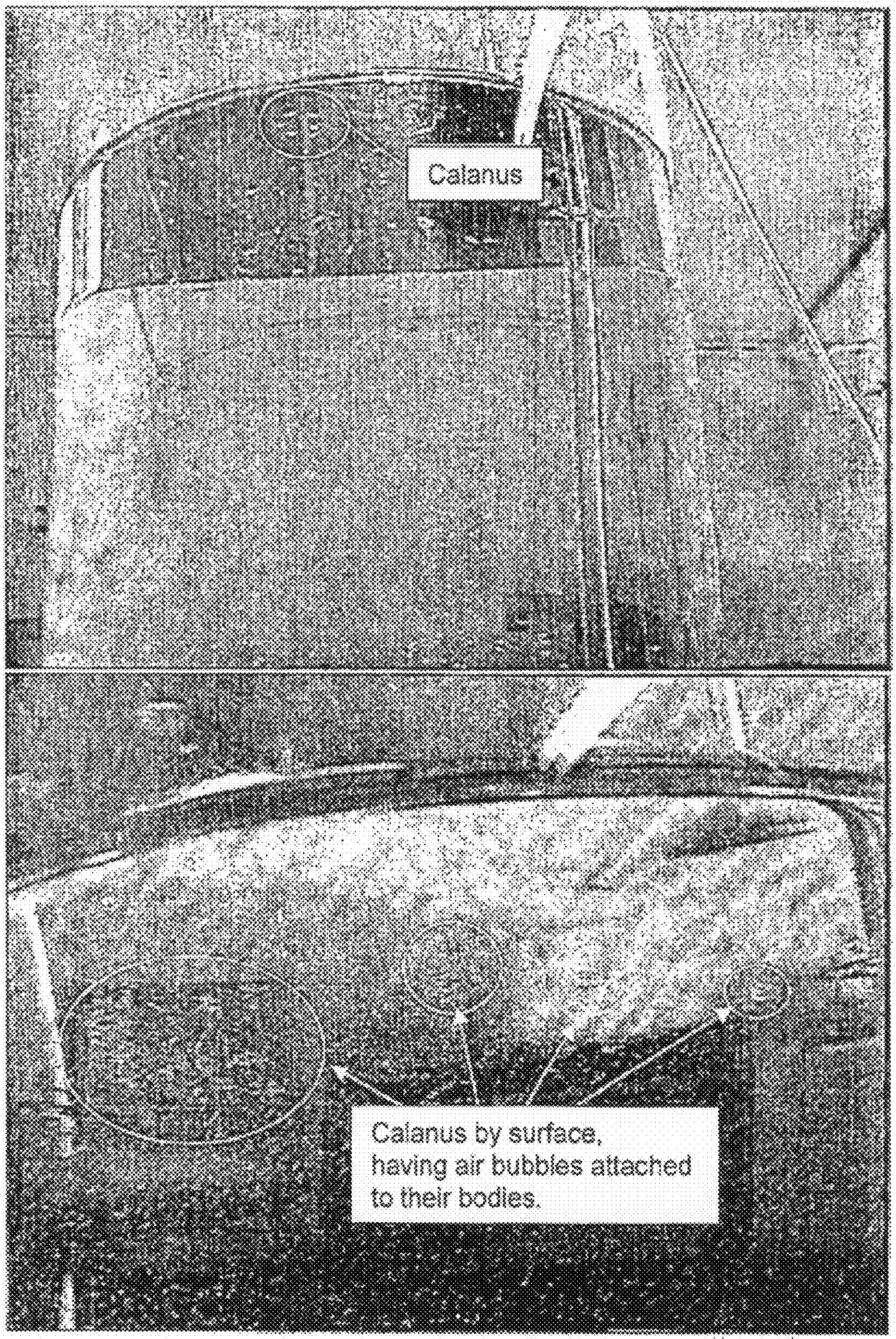
Fig. 6 : Calanus before (above) and after (below) bubble exposure

DEVICE AND METHOD FOR CATCHING ZOOPLANKTON OR OTHER MICROORGANISMS

INTRODUCTION

This application pertains to a harvesting device for zooplankton or other micro organisms in a body of water. More precisely defined it pertains to a method for trawling or skimming zooplankton wherein the harvesting process takes place by means of air bubbles.

PROBLEM TO BE ADDRESSED

The elevation of fresh-water fish, anadromous fish or marine fish is increasing in extent both in Norway and worldwide. One of the greatest problems within the sector is to provide sufficiently high grade fodder to the increasing elevation mass. Most pelagic species of fish that are traditionally used in fodder production are as well as fully taxed already.

Harvesting at lower trophic levels in the sea, for instance zooplankton, phytoplankton or bacteria is regarded as a good alternative for raw matter in fodder production. However this results in major challenges with respect to harvesting techniques and harvesting equipment, see below under "background art". Calanus is a zooplankton having a size of between 1 to 3 mm, which during summer may be caught at depths between 30 to 40 meters. Calanus is an important prey for wild fish, and could have been used on a large scale in for instance elevation of salmon or cod if two conditions were met: Firstly if it was possible to harvest it in an economical fashion, and secondly if it was possible to process it in a swift manner so as for it to be preserved before it dissolved and rotting began.

BACKGROUND ART

Traditional harvesting methods for zooplankton are based on filtration of water by means of a very finely meshed trawl. Regarding the trawl, it must be quite large in order to obtain harvest volumes of significance. A large finely meshed trawl made of flax provides a very large drag force when it is towed through the sea, thus the consumption of fuel on the trawling vessel is very high. Another disadvantage is that the trawl must be towed at a depth of 30 to 40 meters. It is also possible to use harvesting or sieving cages for the harvesting of zooplankton.

It is known techniques from particle purification of water that one may release air bubbles with particle size so that these due to the surface tension of water will attach to the particles in order for said particles to be brought to the surface for filtration or skimming.

The inventors know of whales that may delimit a school of fish by means of releasing air bubbles which scare and thus encloses the school behind a curtain formed more or less as a purse seine.

The following documents have been found to mention bubble diffusers in water:

NO 54817, "Device for leading fish, herring and the like during harvesting" (1932)

NO27776 "Method for the lifting of a mass of fish in seines, nets and the like".

WO 9219100 (PCT/N092/00082), "Method of leading and trapping fish in the sea, and equipment for use in carrying out the method." (1991)

DE 100 28 313 "Fischfanggerät".

Other less relevant patent publications describe the flushing of the sea bed ahead of a trawl to take up shells, as well as built in pumps on a trawl. Pumps are relevant to a pumping device in the present application, but do not anticipate the present application. None of the above patent publications describe zooplankton being harvested. The shown bubble diffusers do not describe diffusers arranged for making fine millimeter size bubbles which shall attach to the zooplankton by means of the surface tension of water. The above mentioned patent publications do not describe the bubbles pacifying the organisms, but rather that they are either scared upwards, or entrained by an overwhelming amount of upwardly flowing air bubbles, thus a much more coarse mechanism than the one which is used in the present application.

SHORT SUMMARY OF THE INVENTION

However the inventor has rejected the use of said deep draft trawl and proposed the idea of a harvesting device for zooplankton or other micro organisms in a body of water, in which the new portion of the invention is a bubble diffuser being submerged in said body of water and arranged for releasing gas bubbles, preferably air, in said body of water so that said bubbles may be attached to zooplankton and bring said zooplankton closer to the surface of said body of water for collection, and in which said bubble diffuser is arranged for forming small bubbles in a desired size range, and a finely meshed skimmer or trawl for collection of zooplankton which has been attached to bubbles and brought towards said surface, in which said trawl is arranged for being used close to said surface of said body of water and towed after trawl lines from a vessel.

According to a preferred embodiment of the invention, the bubble diffuser comprises a diffuser with a pore size in a given size range for formation of bubbles within a desired size range.

According to a preferred embodiment of the invention, said bubble diffuser comprises an air supply hose from a source of pressurized air on a vessel on the surface.

FIGURE CAPTIONS

FIG. 1 is a side elevation view of a harvesting device according to the invention. A vessel tows a bubble diffuser and a trawl which runs shallowly, preferably in the surface and a short span into the body of water.

FIG. 2 is a plan elevation view of a harvesting device according to the invention. As the trawl preferably should run shallowly and thus follow in said vessels propeller wake which is turbulent and thus tear the bubbles off the zooplankton which have come close to the surface, the bubble diffuser should be kept out to one side from the vessels course line by means of at least one deflector. Likewise, the trawl should be kept out to one side of said vessels course line by means of deflectors or trawl doors.

FIGS. 3*a* and 3*b* show a plan elevation view and a cross elevation view along a line A-A in FIG. 3*a* of a trawl or surface skimmer according to the invention.

FIG. 4 shows a laboratory experiment with release of air bubbles in a batch and in continuous release near the bottom of a cylinder with water.

FIG. 5 shows a krill lying in the water surface in the laboratory cylinder caught and kept floating by air bubbles attached to the individual.

FIG. 6 shows Calanus collected in the water surface in the laboratory glass.

DESCRIPTION OF A PREFERRED EMBODIMENT OF THE INVENTION

Laboratory experiments with zooplankton in a measurement cylinder have shown that air bubbles which arbitrarily form in the cylinder may attach themselves to individuals of Calanus and krill. Calanus is a zooplankton. When about two air bubbles have attached to an individual, the air bubbles will provide a buoyancy to an individual in the body of water so that it resists the upwards movement. If about three or more air bubbles attach to the individual it turns out that it becomes incapable of providing resistance to the upwards movement and is brought to the surface by the bubbles. When said Calanus arrives at the surface it will remain lying more or less passively at the surface for about 30 seconds. In laboratory experiments krill turn out to use 30 to 60 seconds to shake off the air bubbles. The bubbles fall after some time off, and the proper movement of said Calanus or said Krill increases so that it begins to descend into the body of water again. Another observation is that if large air bubbles impact the Calanus it may perform a sudden movement or jump, and thus release itself from the bubble. It is thus these properties of bubbles and Calanus/Krill which the inventor thought of to transfer to harvesting of zooplankton. The applicant also presumes that phytoplankton and bacteria may be caught and driven to the surface by small air bubbles. The inventor thus arrived at if air bubbles are artificially brought forth in the body of water, in which said air bubbles are released in or under a mass of Calanus, the Calanus could be brought to the surface where it would be easier to collect and in this manner form the principle of an effective harvesting method. FIG. 5 shows a krill lying in surface position caught by air bubbles which have attached to the individual. One thus developed laboratory experiments with artificial bubble formation in the water by means of a diffuser shown in FIGS. 4 and 6. In this manner it turned out that 20 to 40% of the Calanus was brought too the surface in the laboratory glass. This has then been further developed into a trawl-like device which is illustrated in FIGS. 1, 2 and 3 and which is arranged for being towed after a vessel.

Figure 1:
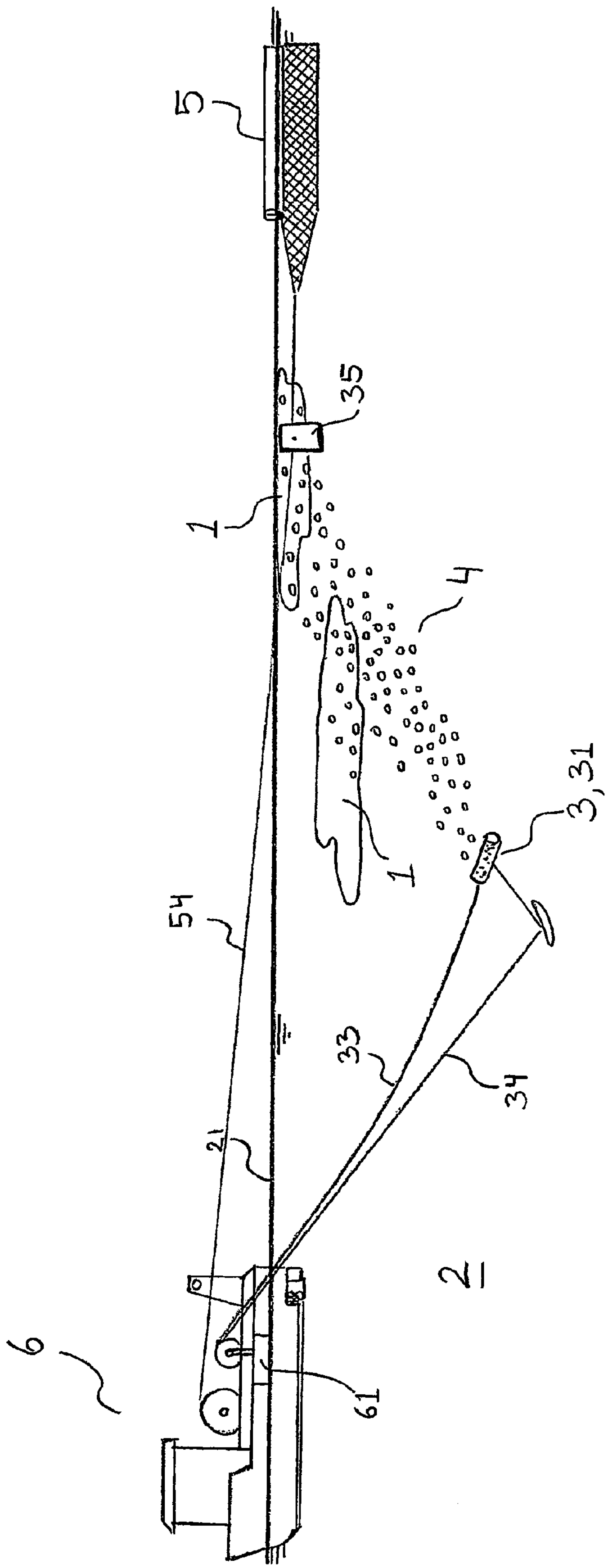

FIG. 1 is a side elevation view of a harvesting device according to the invention. A vessel (6) tows a bubble diffuser (3) and a trawl (5) running shallowly, preferably in the surface and a small span down into the body of water (2). The invention thus comprises a harvesting device for zooplankton (1) or other micro organisms in a body of water (2), with a diffuser (3) arranged for being submerged in the body of water (2). The bubble diffuser is arranged for releasing gas bubbles (4), preferably air, in the body of water so as for said bubbles (4) to attach to zooplankton (1) and bring them closer to the surface (21) of said body of water (2) for collection by means of a skimmer or trawl (5).

The concentration of zooplankton close to the surface will thus be significantly higher than lower down in the body of water and the harvesting may thus be made more effective as a smaller cross section of the body of water close to the surface may be trawled/skimmed in contrast to the large cross section of the body of water between 30 and 40 meters which must be trawled.

Figure 2:
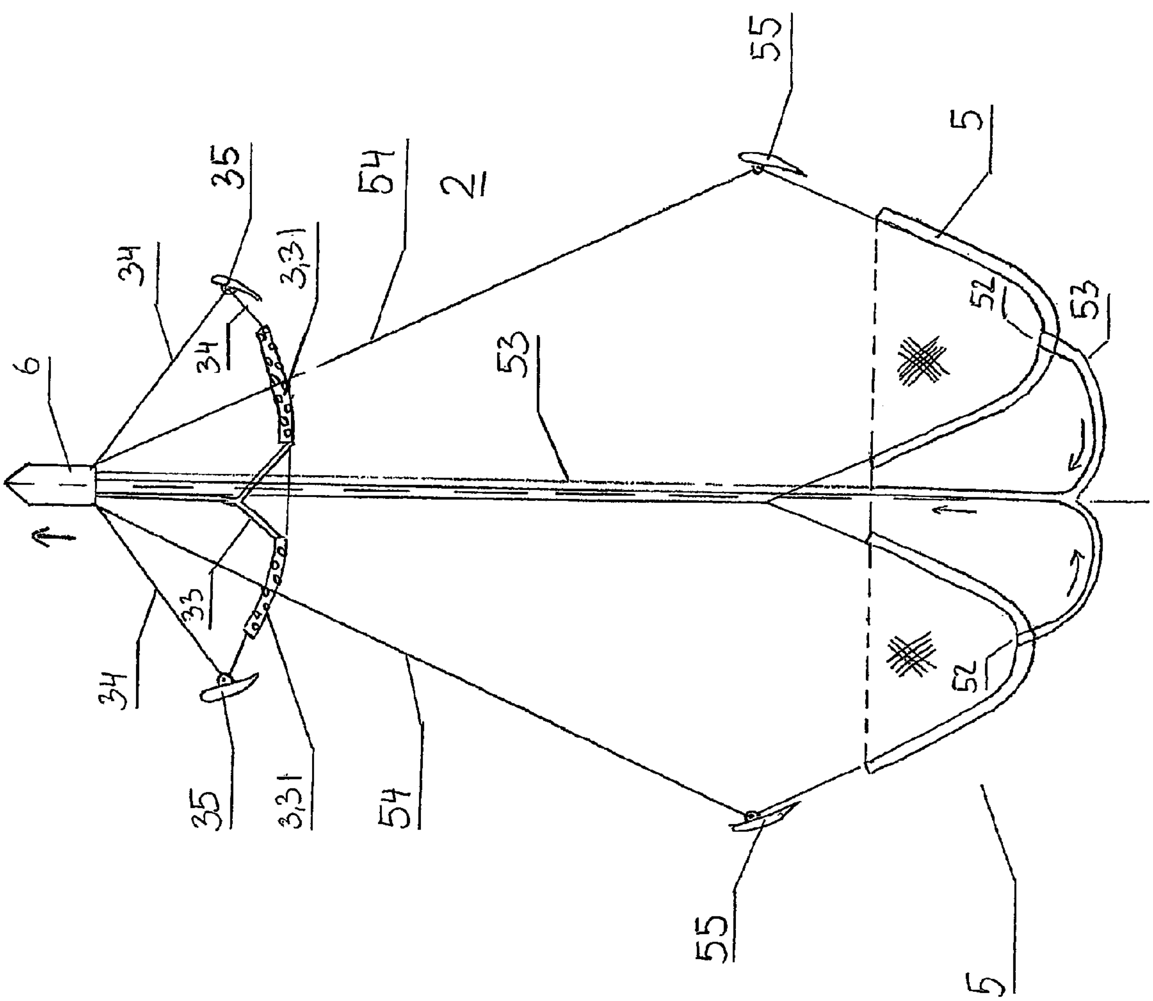
Figure 3:
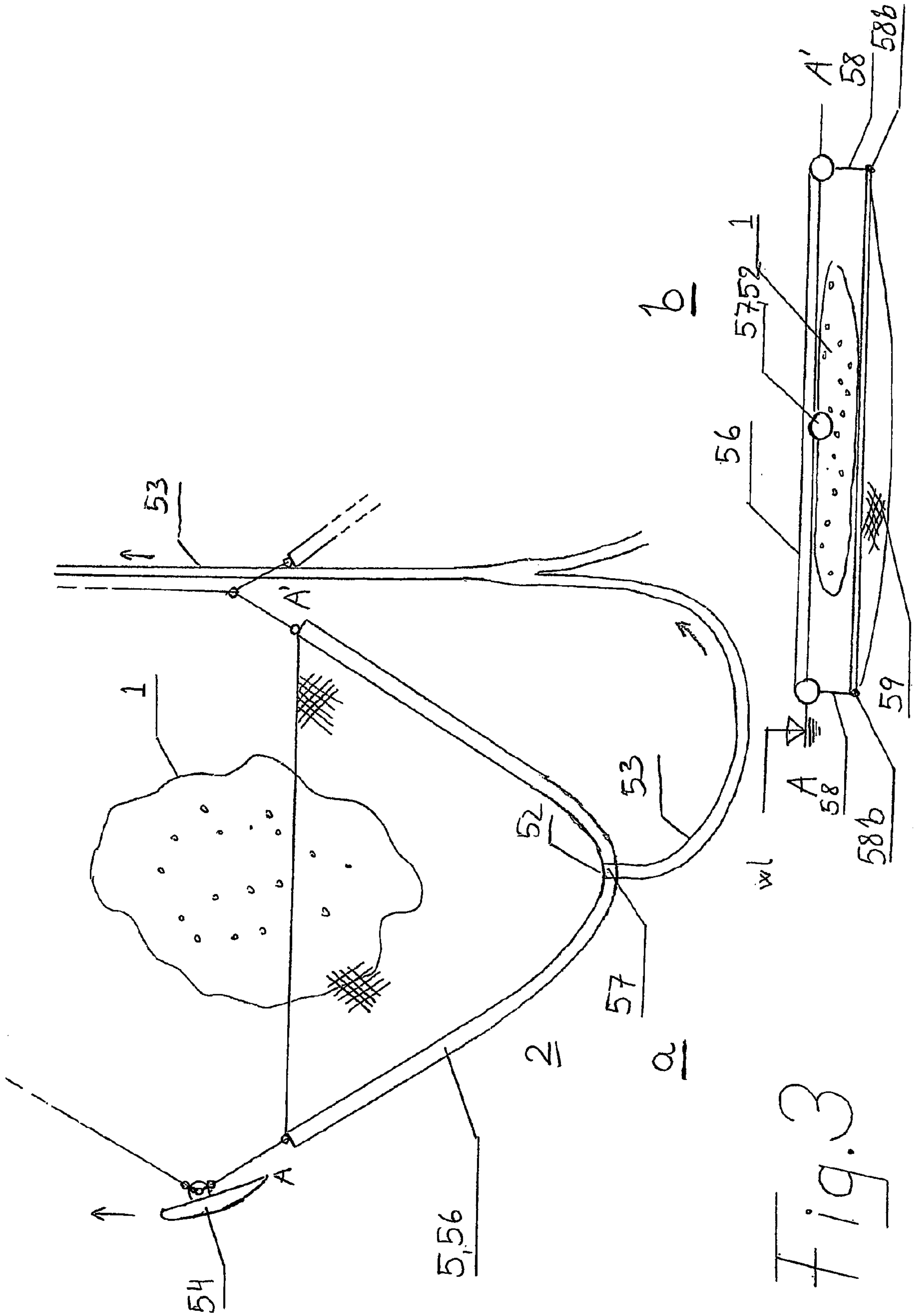

FIG. 2 is a plan elevation view of a harvesting device according to the invention. As the trawl (5) preferably should run shallowly and thus would trail in the wake of said vessel (6), said wake which is turbulent, and thus tear the bubbles (4) off many of said zooplankton (1) whom have arrived near the surface, the bubble diffuser should be kept out to the side of said vessels course line by means of at least one deflector. Likewise said trawl (5) should be kept out to one side of said vessels course line by means of deflectors or trawl doors. In a preferred embodiment the harvesting device comprises a bubble diffuser (3) which is extended out to both sides of the course line and likewise a trawl (5) which is extended to both sides of the course line, or a split trawl which is kept spanned to both sides of said course line, as shown in FIG. 2.

According to a preferred embodiment of the invention, the harvesting device comprises a finely meshed skimmer or trawl (5) for collection of zooplankton (1). The trawl/skimmer is shown in FIGS. 3*a* and *b*. The trawl is arranged for being used close to the surface (21) of said body of water (2) and be towed after trawl lines (54) from a vessel (6). If the trawl is arranged as a skimmer (5) it may have an extended buoyancy collar (56) for extending along the water surface (21) and arranged in a V-shape in which the apex (57) points backwards and the branches are towed by said trawl lines (54) from the deflectors or trawl doors (55). A skirt (58) extends from the buoyancy collar (56) and may be furnished with a lead line (58*b*) and holding a bottom net (59) which collects zooplankton and prevents the individuals from escaping under the skirt.

According to a preferred embodiment of the invention, the bubble diffuser (3) of the harvesting device comprises a diffuser (31) underwater, for formation of bubbles in a desired size range. Alternatively air and water may be mixed in a compressor already on deck so as for the desired bubble size is obtained without a diffuser. According to the preferred embodiment of the invention, the bubble diffuser comprises an air supply hose (33) from a source of pressurised air (61) on a vessel (6) on the surface (21).

Said bubble diffuser (3) is in the preferred embodiment arranged for being towed after a vessel (6) after a line (34).

The harvesting device according to the preferred embodiment of the invention is so arranged as for the bubble diffuser (3) to be extended towards the sides with respect to said vessels (6) propulsion direction by means of at least one deflector (35). The harvesting device according to the preferred embodiment of the invention is so arranged as for said trawl (5) to be extended towards the sides with respect to said vessels (6) propulsion direction by means of at least one trawl deflector (55). The harvesting device according to the preferred embodiment of the invention is further arranged such that said trawl (5) is provided with an suction inlet (52) to a transportation hose (53) for the collection of zooplankton (1). The harvesting device according to the preferred embodiment of the invention is so arranged such that the transportation hose (53) extends from the suction inlet (52) in the aft of said trawl (5) to said vessel (6).

The invention claimed is:

1. A harvesting device for zooplankton or other micro organisms in a body of water, comprising:

a bubble diffuser for being towed behind a vessel and being submerged in the body of water, said bubble diffuser being arranged for releasing small air bubbles into the body of water, so that the air bubbles attach to zooplankton and bring the zooplankton near a surface of the body of water; and a fine mesh trawl for being towed after trawl lines behind the vessel and near the surface of the body of water, for collecting the zooplankton near the surface of the body of water, said trawl being provided with a buoyancy collar extending along the surface of the body of water and arranged in a V-shape in which an apex is directed rearwards, and with forward directed branches of said collar being towed by said trawl lines with one or more first deflectors, wherein said trawl is provided with a skirt extending down from said buoyancy collar and is provided with a lead line, and said skirt holds a bottom net for collecting the zooplankton.

2. The harvesting device according to claim 1, wherein said bubble diffuser comprises an air supply hose from a source of pressurized air on the vessel on the surface of the body of water.

3. The harvesting device according to claim 1, wherein said bubble diffuser is arranged for being towed behind the vessel by means of a line.

4. The harvesting device according to claim 3, wherein said bubble diffuser extends laterally with respect to the vessel's propulsion direction by means of at least one second deflector.

5. The harvesting device according to claim 1, wherein said trawl is arranged for being extended laterally with respect to the vessel's propulsion direction by means of said one or more first deflectors.

6. The harvesting device according to claim 1, wherein said trawl is provided with a suction inlet at the apex to a transportation tube for the zooplankton.

7. The harvesting device according to claim 6, wherein said transportation tube extends from said suction inlet to the vessel.

8. A method for harvesting zooplankton or other micro organisms in a body of water, comprising the steps of:

towing one or more bubble diffusers behind a vessel, said bubble diffusers being submerged in the body of water;

releasing small air bubbles from said bubble diffuser into the body of water, the air bubbles attaching to zooplankton and bringing the zooplankton near a surface of the body of water;

providing a fine mesh trawl with a buoyancy collar extending along the surface of the body of water, said collar arranged in a V-shape with an apex directed rearwards and with forward directed branches of said collar and a skirt extending down from said buoyancy collar with a lead line and a bottom net spanned by said collar for collecting the zooplankton; and towing said fine mesh trawl by said trawl lines provided with one or more first deflectors behind the vessel and in or near the surface of the body of water so that the zooplankton is collected near the surface of the body of water.

9. The method according to claim 8, further comprising the steps of:

compressing air in a pressurised air source on board the vessel; and transporting the pressurised air through an air supply hose to said bubble diffuser.

10. The method according to claim 8, further comprising the step of towing said bubble diffuser behind the vessel by means of a line.

11. The method according to claim 8, further comprising the step of towing said one or more bubble diffusers laterally relative to the propulsion direction of the vessel by means of one or more diffuser deflectors.

12. The method according to claim 8, further comprising the step of extending said trawl laterally relative to the propulsion direction of the vessel by means of at least one of said one or more first deflectors.

13. The method according to claim 8, further comprising the step of pumping in harvested zooplankton from said trawl with a suction device with a transport tube.

14. The method according to claim 13, further comprising the step of extending said transport tube between said suction device at said trawl and the vessel.

* * * * *